(12) United States Patent
Numnual et al.

(10) Patent No.: US 8,550,731 B2
(45) Date of Patent: Oct. 8, 2013

(54) BLADE DRIVE DEVICE AND OPTICAL DEVICE

(75) Inventors: Phichet Numnual, Pathumthani (TH); Prapas Charoensilputthakun, Pathumthani (TH)

(73) Assignee: Seiko Precision Inc., Narashino-Shi (JP)

( * ) Notice: Subject to any disclaimer, the term of this patent is extended or adjusted under 35 U.S.C. 154(b) by 187 days.

(21) Appl. No.: 13/053,568

(22) Filed: Mar. 22, 2011

(65) Prior Publication Data

US 2011/0170852 A1    Jul. 14, 2011

Related U.S. Application Data

(63) Continuation of application No. PCT/JP2009/062630, filed on Jul. 10, 2009.

(30) Foreign Application Priority Data

Oct. 14, 2008  (JP) ................. 2008-265793

(51) Int. Cl.
  *G03B 9/02* (2006.01)
(52) U.S. Cl.
  USPC ....................................................... 396/505
(58) Field of Classification Search
  USPC ....................................................... 396/505
  See application file for complete search history.

(56) References Cited

U.S. PATENT DOCUMENTS

| | | | | |
|---|---|---|---|---|
| 5,337,110 A | * | 8/1994 | Dowe ............................ | 396/449 |
| 6,027,261 A | * | 2/2000 | Naganuma ................... | 396/508 |
| 6,086,267 A | * | 7/2000 | Tsuzuki et al. ............... | 396/459 |
| 6,747,703 B1 | * | 6/2004 | Simamura .................... | 348/362 |

FOREIGN PATENT DOCUMENTS

| | | |
|---|---|---|
| JP | 63-257732 | 10/1988 |
| JP | 3-42133 | 4/1991 |
| JP | 3-171121 | 7/1991 |
| JP | 2001-174860 A1 | 6/2001 |
| JP | 2001-296580 | 10/2001 |

OTHER PUBLICATIONS

International Search Report for International Application No. PCT/JP2009/062630 dated Oct. 1, 2009.
Notification of Submission of Opinion received from the Korean Intellectual Property Office on counterpart application No. 10-2011-7005977 dated Apr. 18, 2012 with English translation (8 pages).
Notification of Reasons for Refusal received from the Japanese Patent Office on corresponding application No. 2008-265793 dated Jul. 10, 2012 with English translation (4 pages).

* cited by examiner

*Primary Examiner* — W B Perkey
*Assistant Examiner* — Linda B Smith
(74) *Attorney, Agent, or Firm* — Kratz, Quintos & Hanson, LLP

(57) ABSTRACT

A blade drive device includes: a board including an optical path opening; a blade including a plurality of openings; a first drive source that swings the blade to move toward and away from the optical path opening; and a second drive source that changes a position of a swinging fulcrum of the blade relative to the board. The first drive source includes a first rotor and a first transmitting portion transmitting a rotation of the first rotor to the blade. The second drive source includes a second rotor and a second transmitting portion transmitting a rotation of the second rotor to the blade. The blade includes a cam slot engaging the first transmitting portion and a fitting hole into which the second transmitting portion slidably fits.

6 Claims, 5 Drawing Sheets

BLADE DRIVE DEVICE AND OPTICAL DEVICE

CROSS-REFERENCE TO RELATED APPLICATION

This application is a continuation of and claims priority to International Patent Application No. PCT/JP2009/062630 filed on Jul. 10, 2009, which claims priority to Japanese Patent Application No. 2008-265793 filed on Oct. 14, 2008, subject matter of these patent documents is incorporated by reference herein in its entirety.

BACKGROUND OF THE INVENTION

1. Field of the Invention

The present invention relates to blade drive devices and optical devices.

2. Description of the Related Art

It is known a device for adjusting the amount of light passing through an optical path opening formed in a board by use of a blade having plural openings (see Japanese Unexamined Utility Model Application Publication No. 3-42133).

In order to overlap the optical path opening and each of the openings formed in the blade side, plural openings formed in the blade side have to be aligned in the moving direction of the blade. Further, the blade rotates about a given fulcrum. Thus, the plural openings have to be provided on an arc line about a given fulcrum. In this manner, since the positions of the openings are limited, the size of the blade may be increased.

SUMMARY OF THE INVENTION

It is therefore an object of the present invention to provide a blade drive device that includes a blade with a reduced size and an optical device that includes the same.

According to an aspect of the present invention, there is provided a blade drive including: a board including an optical path opening; a blade including a plurality of openings; a first drive source that swings the blade to move toward and away from the optical path opening; and a second drive source that changes a position of a swinging fulcrum of the blade relative to the board, wherein: the first drive source includes a first rotor and a first transmitting portion transmitting a rotation of the first rotor to the blade; the second drive source includes a second rotor and a second transmitting portion transmitting a rotation of the second rotor to the blade; and the blade includes a cam slot engaging the first transmitting portion and a fitting hole into which the second transmitting portion slidably fits.

DESCRIPTION OF THE PREFERRED EMBODIMENT

Figure 1:
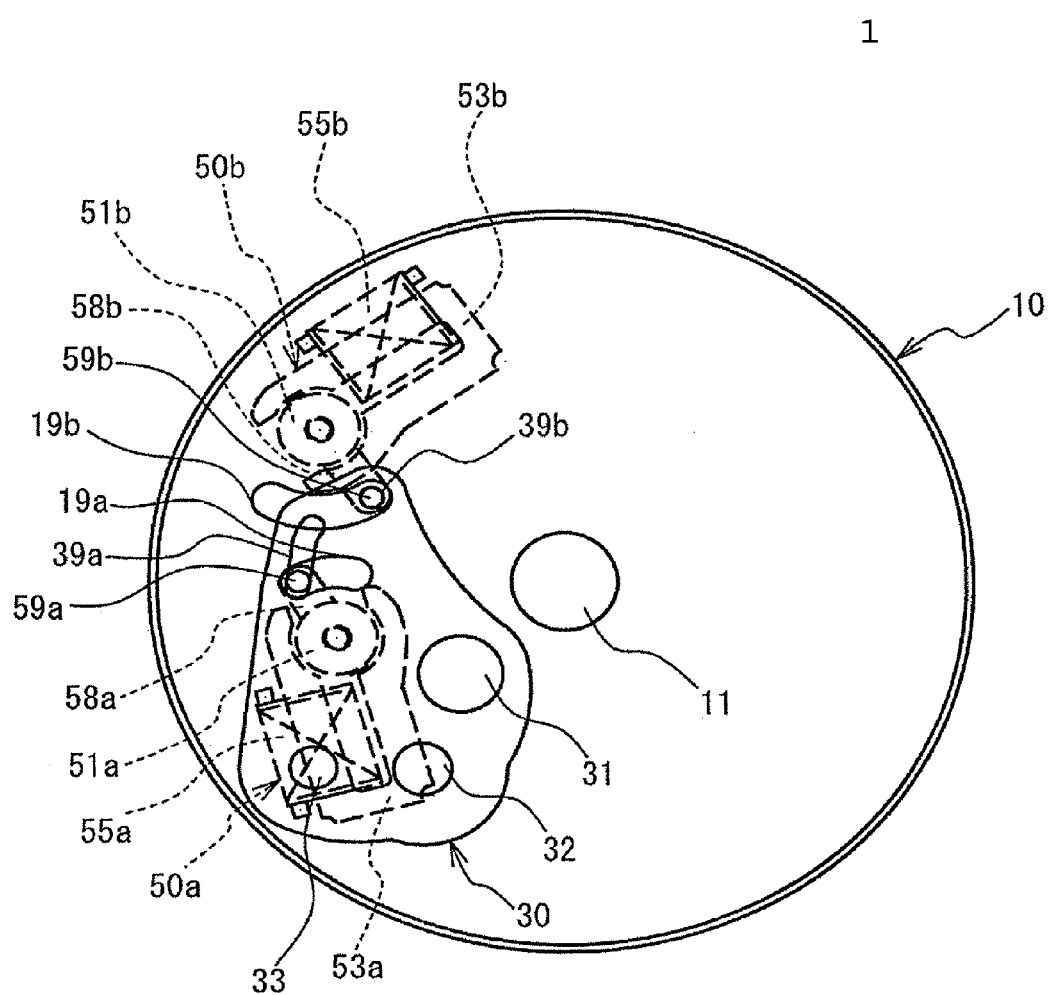
FIG. 1 is a front view of a blade drive device according to a present embodiment.

FIG. 1 is a front view of a blade drive device according to a present embodiment employed in an optical device. The blade drive device 1 functions as an aperture device for adjusting the amount of light entering an image pickup element (not illustrated) installed in the optical device. The blade drive device 1 includes a board 10, a blade 30, and electromagnetic actuators 50a and 50b.

The board 10 is provided at its center portion with an optical path opening 11 through which the light passes from the object side. The blade 30 is movable toward and away from the optical path opening 11. The blade 30 swings about a given position serving as a swinging fulcrum. The blade 30 is arranged at a front side of the board 10 in FIG. 1. The blade 30 has three openings 31 to 33. Each of the openings 31 to 33 is smaller than the optical path opening 11. Further, the openings 31 to 33 are smaller in size in this order. The optical path opening 11 overlaps any one of the openings 31 to 33, thereby reducing the amount of light passing through the optical path opening 11. Furthermore, in a state where the blade 30 recedes from the optical path opening 11, the amount of light passing through the optical path opening 11 is maximum. The state where the amount of light passing is maximum is referred to as a fully opened state. A state where the opening 31 overlaps the optical path opening 11 is referred to as a first aperture state. A state where the opening 32 overlaps the optical path opening 11 is referred to as a second aperture state. A state where the opening 33 overlaps the optical path opening 11 is referred to as a third aperture state. FIG. 1 illustrates the blade drive device 1 in the fully opened state.

The electromagnetic actuators 50a and 50b indicated by dashed lines are provided in the rear side of the board 10. The electromagnetic actuators 50a and 50b serve as drive sources of the blade 30. The electromagnetic actuator 50a corresponds to a first drive source. The electromagnetic actuator 50b corresponds to a second drive source. The electromagnetic actuator 50a swings the blade 30. The electromagnetic actuator 50b changes the swinging fulcrum of the blade 30. Specifically, the electromagnetic actuator 50a includes: a rotor 51a rotatably supported; and a transmitting portion 58a secured to the rotor 51a and transmitting the rotational force of the rotor 51a to the blade 30. The rotor 51a corresponds to a first rotor. The transmitting portion 58a corresponds to a first transmitting portion. The transmitting portion 58a projects radially outwardly from the rotor 51a, and engages a cam slot 39a formed in the blade 30. Specifically, the transmitting portion 58a is provided at its one end with a drive pin 59a, which projects in the optical axis direction and engages the cam slot 39a. Further, the board 10 is provided with an escape slot 19a, which has an arc shape and which escapes the movement of the drive pin 59a. In addition, the escape slot 19a is indicated by a solid line in each figure.

The rotation of the rotor 51a swings the drive pin 59a in a given range, and then the drive pin 59a moves within the escape slot 19a. The movement of the drive pin 59a within the escape slot 19a swings the blade 30 about a given position as a center.

The electromagnetic actuator 50a includes a rotor 51a, a stator 53a, and a coil 55a. The rotor 51a is magnetized to have different magnetic poles in its circumferential direction. The coil 55a for exciting the stator 53a is wound around the stator 53a. The stator 53a has a letter U shape, and has a magnetic pole portion at each of both ends thereof. The energization of the coil 55a excites the magnetic pole portions to be different in polarity from each other. The rotor 51a is rotated in a given range by magnetically attractive and repulsive forces generated between the rotor 51a and the stator 53a.

The basic structure of the electromagnetic actuator 50b is similar to that of the electromagnetic actuator 50a. The electromagnetic actuator 50b includes a rotor 51b, a stator 53b, and a coil 55b. In addition, the rotational range of the rotor 51b is slightly longer than that of the rotor 51a. The rotor 51b corresponds to a second rotor. The transmitting portion 58b corresponds to a second transmitting portion.

The transmitting portion 58b is fitted into a fitting hole 39b formed in the blade 30. Specifically, the drive pin 59b of the transmitting portion 58b is slidably fitted into the fitting hole 39b. This allows the blade 30 to swing about the drive pin 59b serving as the swinging fulcrum. The drive pin 59b moves within an escape slot 19b. In addition, the escape slot 19b is indicated by a solid line in each figure. The position of the drive pin 59b is changed with the rotation of the rotor 51b, thereby changing the position of the swinging fulcrum of the blade 30. Further, the position of the drive pin 59b relative to the blade 30 is not changed, whereas the position of the drive pin 59b relative to the board 10 is changed. In contrast, the position of the drive pin 59a relative to the blade 30 is changed.

Figure 2:
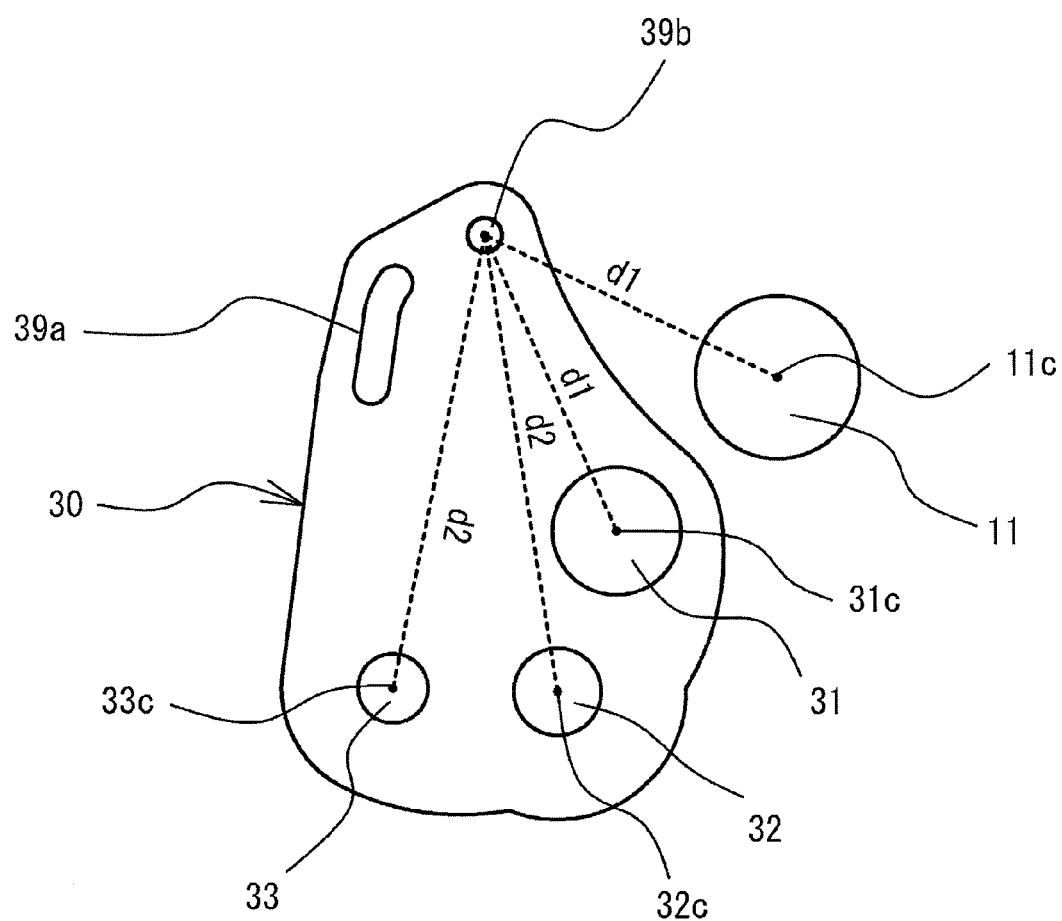
FIG. 2 is an explanatory view of a blade.

Next, the blade 30 will be described in detail. FIG. 2 is an explanatory view of the blade 30. Additionally, FIG. 1 illustrates the optical path opening 11 and the positional relationship between the blade 30 and the optical path opening 11 in the fully opened state. In the fully opened state, a distance d1, to a center 11c of the optical path opening 11 from the fitting hole 39b into which the drive pin 59b is fitted, is identical to a distance d1, to a center 31c of the opening 31 from the fitting hole 39b. Further, a distance d2, to a center 32c of the opening 32 from the fitting hole 39b, is identical to a distance d2, to a center 33c of the opening 33 from the fitting hole 39b. That is, the distances from the swinging fulcrum of the blade 30 (the position of the fitting hole 39b) to the center positions of the openings are different. In other words, all of the centers 31c to 33c of the openings 31 to 33 are not presented on an arc line about a common fulcrum.

In a conventional blade drive device, a fulcrum of a blade is fixed at one position. For this reason, when plural openings are provided in the blade, the openings have to be arranged at such positions to have identical distance thereto from the fulcrum of the blade. Therefore, the positions of the openings are limited, so this is a factor that increases the size of the blade.

However, in the blade drive device 1 according to the present embodiment, the openings 31 to 33 are provided at such positions to have different distances thereto from the fulcrum. Accordingly, the size of the blade 30 is smaller than that of a blade in which plural openings are provided to have identical distance thereto from a fulcrum. Further, the blade 30 is reduced in size, whereby the moving range of the blade 30 is made small.

In addition, the distance between adjacent openings cannot be made shorter than a given distance. In a case where the distance between the openings is too short, when one of openings overlaps the optical path opening 11, the light passing through the optical path opening 11 enters the image pickup element via the opening adjacent to one of openings, so that a given amount of the exposure may be not ensured. Accordingly, the distance between the openings needs a certain distance. In the blade 30 of the blade drive device 1 according to the present embodiment, the positions of the openings 31 to 33 are set, in light of such a distance between the openings.

Figure 3:
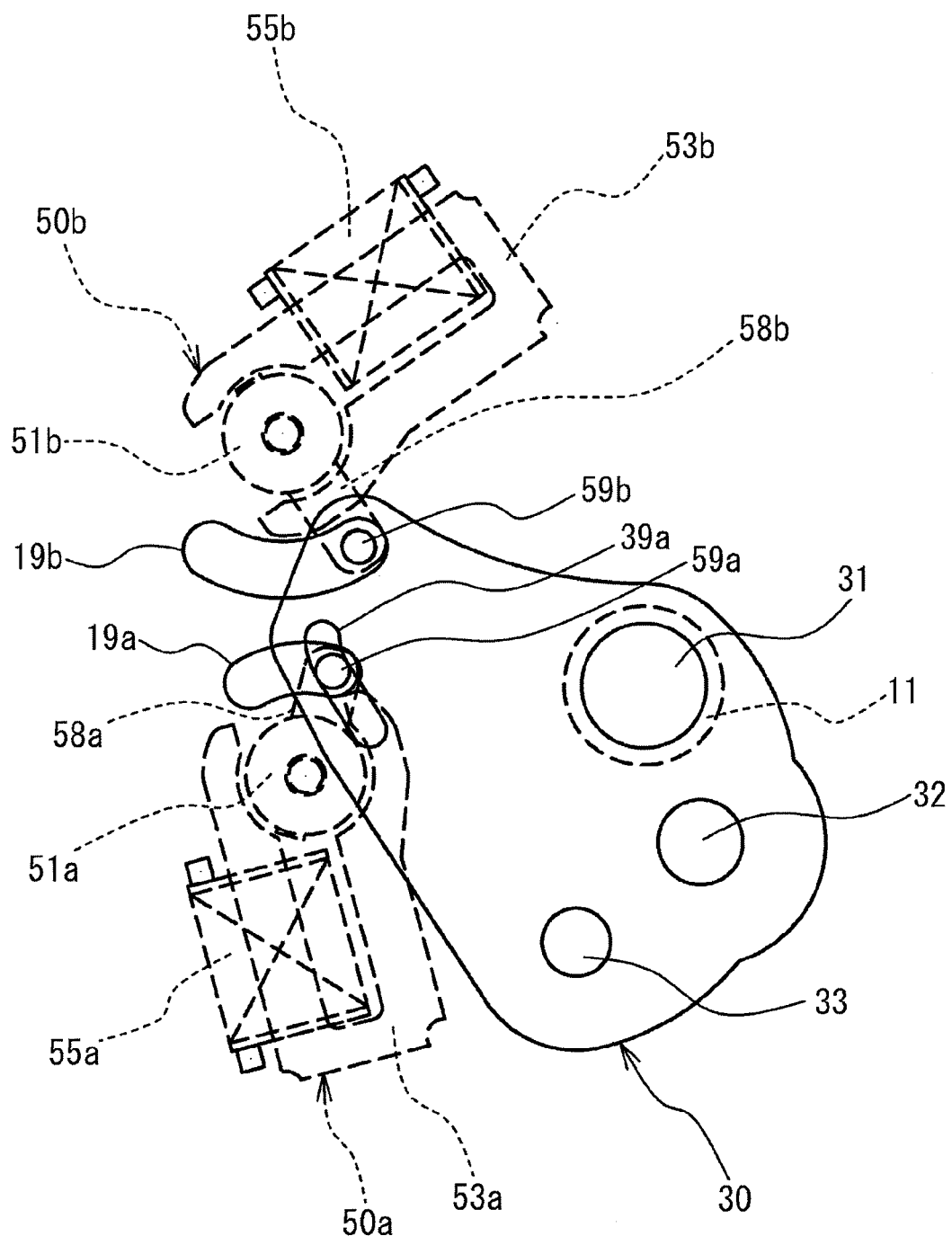
FIG. 3 is a front view of the blade drive device in a first aperture state.

Next, an operation of the blade drive device 1 will be described. FIG. 3 is a front view of the blade drive device 1 in the first aperture state. Additionally, the board 10 is partially omitted in FIG. 3.

In the fully opened state illustrated in FIG. 1, the transmitting portion 58a rotates from one end of the rotational range toward the other end thereof to stop at the other end. Therefore, the drive pin 59a moves within the cam slot 39a, so that the blade 30 moves to the position where the opening 31 overlaps the optical path opening 11 as illustrated in FIG. 3. Further, the transmitting portion 58b does not rotate both in the fully opened state and in the first aperture state, and remains at the same position. That is, the swinging fulcrum of the blade 30 is not changed.

Figure 4:
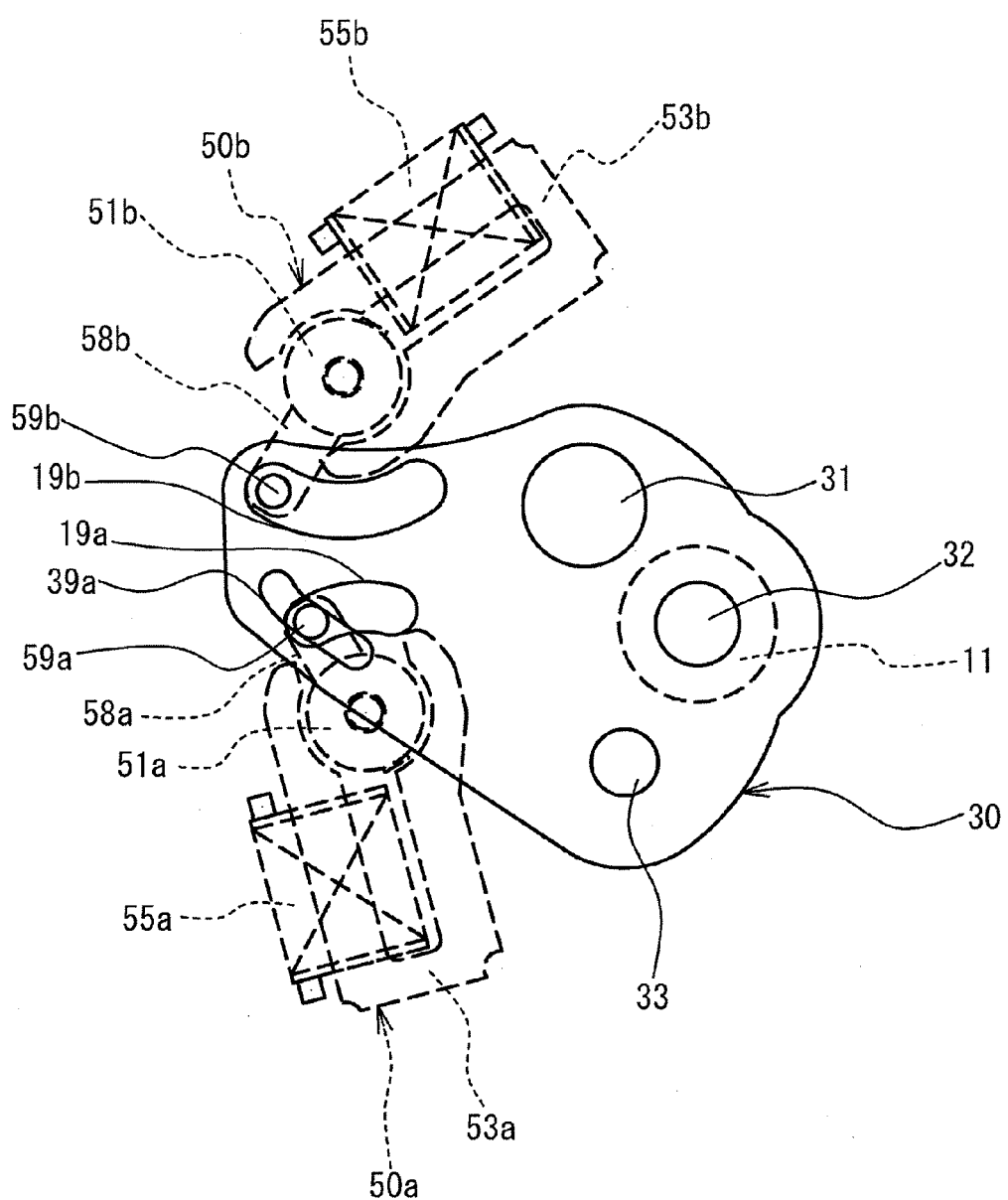
FIG. 4 is a front view of the blade drive device in a second aperture state.

FIG. 4 is a front view of the blade drive device 1 in the second aperture state.

In the first aperture state illustrated in FIG. 3, the transmitting portion 58a rotates again from the other end of its rotational range to one end thereof, and then stops at the one end position. In addition, the transmitting portion 58b rotates from one end of its rotational range to the other end thereof, and then stops at the other end. The transmitting portion 58b rotates to move the drive pin 59b, thereby changing the position of the drive pin 59b relative to the board 10. Thus, the swinging fulcrum of the blade 30 relative to the board 10 is changed. Therefore, the blade 30 moves to the position where the opening 32 overlaps the optical path opening 11. In this manner, the second aperture state is defined.

Figure 5:
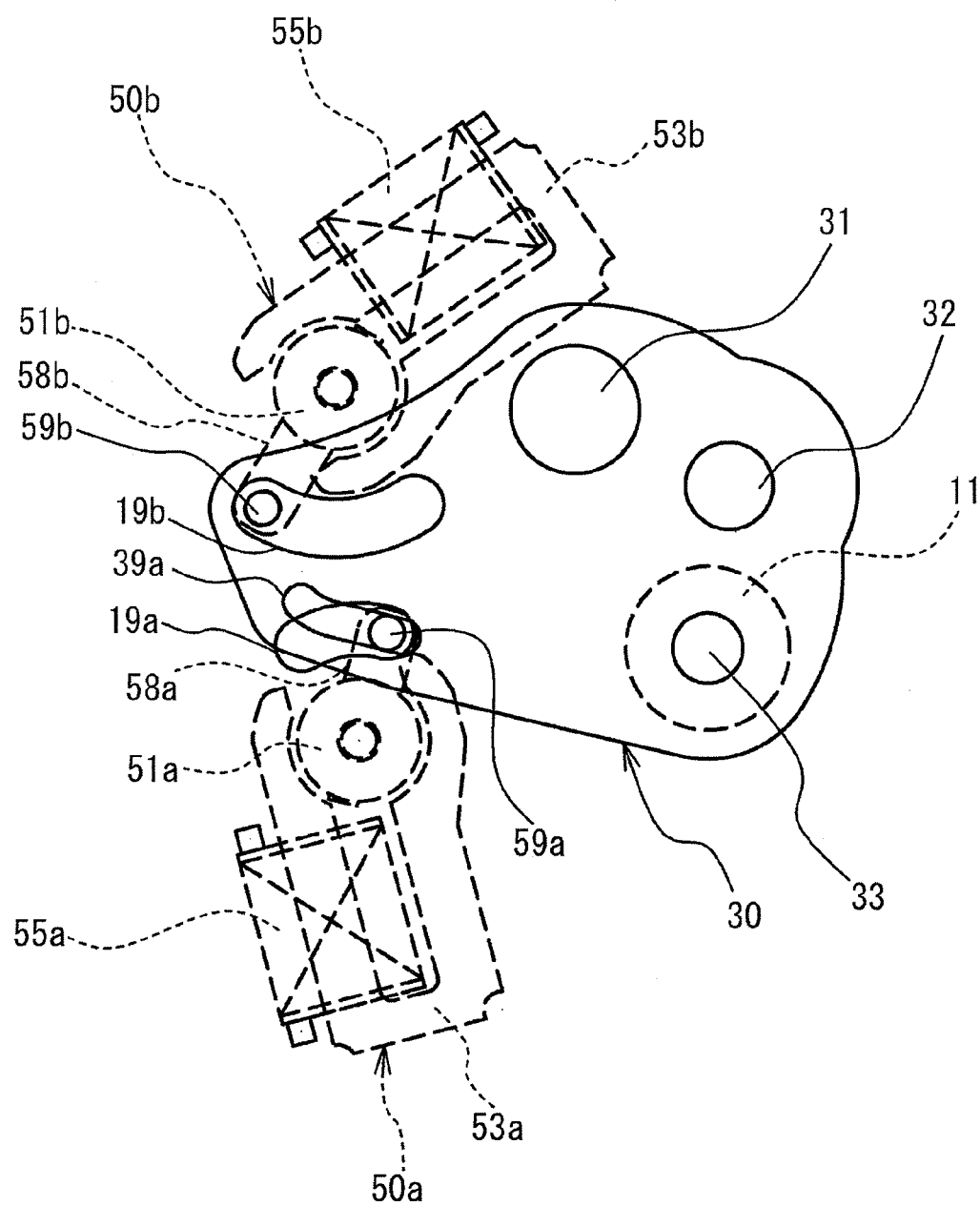
FIG. 5 is a front view of the blade drive device in a third aperture state.

FIG. 5 is a front view of the blade drive device 1 in the third aperture state.

In the second aperture state illustrated in FIG. 4, the transmitting portion 58a rotates again from one end of its rotational range to the other end thereof, and then stops at the other end. In addition, the transmitting portion 58b is located at the other end of its rotational range. The transmitting portion 58a rotates to move the drive pin 59a within the cam slot 39a, and then the blade 30 moves to the position where the opening 33 overlaps the optical path opening 11. In this way, the third aperture state is defined.

In the third aperture state illustrated in FIG. 5, the transmitting portion 58a rotates again from the other end of its rotational range to one end thereof, and then stops at the one end position. Further, the transmitting portion 58b rotates from the other end of its rotational range to one end, and then stops at the one end position. This changes the position of the drive pin 59b relative to the board 10 and also changes the swinging fulcrum of the blade 30 relative to the board 10. Accordingly, the blade 30 moves to such a position to recede from the optical path opening 11, as illustrated in FIG. 1. In this way, the fully opened state is defined.

As mentioned above, each of the rotors 51a and 51b is configured to stop at the both ends of its rotational ranges. For example, when the rotor is configured to stop at a partway of its rotational range in addition to the both ends thereof, the hunting of the rotor may be caused. However, in the present embodiment, each of the rotors 51a and 51b has only to stop at the both ends of its rotational range. For example, the board 10 is provided on its rear side with stoppers which define the rotational ranges of the transmitting portions 58a and 58b, thereby preventing the hunting of the rotors 51a and 51b.

While the exemplary embodiments of the present invention have been illustrated in detail, the present invention is not limited to the above-mentioned embodiments, and other embodiments, variations and modifications may be made without departing from the scope of the present invention.

Although the present embodiment has exemplified the blade provided with three openings 31 to 33, at least one of the openings 31 to 33 may be provided with an ND filter. Moreover, the present embodiment has exemplified both of the first and second drive sources each employing the swinging motor capable of stopping at the both ends of its rotational range.

However, one of the drive sources may employ a stepping motor capable of rotating 360 degrees to drive a blade having three or more openings.

Finally, several aspects of the present invention are summarized as follows.

According to an aspect of the present invention, there is provided a blade drive including: a board including an optical path opening; a blade including a plurality of openings; a first drive source that swings the blade to move toward and away from the optical path opening; and a second drive source that changes a position of a swinging fulcrum of the blade relative to the board, wherein: the first drive source includes a first rotor and a first transmitting portion transmitting a rotation of the first rotor to the blade; the second drive source includes a second rotor and a second transmitting portion transmitting a rotation of the second rotor to the blade; and the blade includes a cam slot engaging the first transmitting portion and a fitting hole into which the second transmitting portion slidably fits.

The swinging fulcrum of the swing of the blade is changeable, whereby the plural openings formed in the blade may be not presented on an arc line about the same fulcrum. This improves the degree of freedom in the placement of the plural openings formed in the blade, so that the positions of the openings can be set not to increase the size of the blade.

The invention claimed is:

1. A blade drive device comprising:
a board including an optical path opening;
a blade including a plurality of openings;
a first drive source that swings the blade to move toward and away from the optical path opening; and
a second drive source that changes a position of a swinging fulcrum of the blade relative to the board,
wherein: the first drive source includes a first rotor and a first transmitting portion transmitting a rotation of the first rotor to the blade;
the second drive source includes a second rotor and a second transmitting portion transmitting a rotation of the second rotor to the blade; and
the blade includes a cam slot engaging the first transmitting portion and a fitting hole into which the second transmitting portion slidably fits, wherein the first transmitting portion rotates around a first axis, and the second transmitting portion rotates around a second axis spaced apart from the first axis.

2. The blade drive device of claim 1, wherein the first rotor stops at both ends of a given rotational range of the first rotor.

3. The blade drive device of claim 1, wherein the second rotor stops at both ends of a given rotational range of the second rotor.

4. The blade drive device of claim 1, wherein the number of the plurality of openings of the blade is three or more.

5. The blade drive device of claim 1, wherein distances from the swinging fulcrum of the blade to center positions of the openings of the blade are different.

6. An optical device comprising a blade drive device,
the blade drive device including:
a board including an optical path opening;
a blade including a plurality of openings;
a first drive source that swings the blade to move toward and away from the optical path opening; and
a second drive source that changes a position of a swinging fulcrum of the blade relative to the board,
wherein: the first drive source includes a first rotor and a first transmitting portion transmitting a rotation of the first rotor to the blade;
the second drive source includes a second rotor and a second transmitting portion transmitting a rotation of the second rotor to the blade; and
the blade includes a cam slot engaging the first transmitting portion and a fitting hole into which the second transmitting portion slidably fits, wherein the first transmitting portion rotates around a first axis, and the second transmitting portion rotates around a second axis spaced apart from the first axis.

* * * * *